United States Patent [19]

Megrgardt et al.

[11] Patent Number: 5,077,612
[45] Date of Patent: Dec. 31, 1991

[54] PORTABLE ELECTRONIC PICTURE RECORDING DEVICE WITH NONVOLATILE ELECTRONIC MEMORY

[75] Inventors: Soenke Megrgardt, March; Ljubomir Micic, Freiburg, both of Fed. Rep. of Germany

[73] Assignee: Deutsche ITT Industries GmbH, Freilburg, Fed. Rep. of Germany

[21] Appl. No.: 456,125

[22] Filed: Dec. 20, 1989

[30] Foreign Application Priority Data

Dec. 21, 1988 [EP] European Pat. Off. ........... 88121385

[51] Int. Cl.$^5$ ............................................. H04N 5/30
[52] U.S. Cl. .................................... 358/209; 358/909; 358/310
[58] Field of Search ............... 358/310, 346, 339, 909, 358/182, 209, 346, 339; 365/112, 154; 371/24, 21.1, 40.1

[56] References Cited

U.S. PATENT DOCUMENTS

| | | | |
|---|---|---|---|
| 3,868,652 | 2/1975 | Cooper et al. | 365/145 |
| 4,325,088 | 4/1982 | Wright | 358/182 |
| 4,489,351 | 12/1984 | Darc | 358/209 |
| 4,593,324 | 6/1986 | Ohkubo et al. | 358/261 |
| 4,599,657 | 7/1986 | Kinoshita et al. | 358/335 |
| 4,604,668 | 8/1986 | Lemelson | 360/10.1 |
| 4,651,227 | 3/1987 | Yunoki et al. | 358/310 |
| 4,713,157 | 12/1987 | McMillan et al. | 204/192.11 |
| 4,739,417 | 4/1988 | Ogawa | 358/906 |
| 4,748,503 | 5/1988 | Pirsch | 358/135 |
| 4,758,883 | 7/1988 | Kawahara et al. | 358/909 |
| 4,763,204 | 8/1988 | Kinoshita et al. | 358/909 |
| 4,803,554 | 2/1989 | Pape | 358/909 |
| 4,827,348 | 5/1989 | Ernest et al. | 358/909 |
| 4,858,025 | 8/1989 | Tabei | 358/310 |
| 4,860,108 | 8/1989 | Saito et al. | 358/213.13 |
| 4,882,633 | 11/1989 | Nakatani | 358/339 |

FOREIGN PATENT DOCUMENTS

| | | |
|---|---|---|
| 0184138 | 6/1986 | European Pat. Off. . |
| 0202009 | 11/1986 | European Pat. Off. . |
| 0207675 | 1/1987 | European Pat. Off. . |
| 3613271 | 10/1987 | Fed. Rep. of Germany . |

OTHER PUBLICATIONS

Patent Abstracts of Japan, Book 12, No. 177, p. E613, May 25, 1988 "JP-A-62 284 586"(Fuji Photo Film Co. Ltd.) Dec. 10, 1987.
Patent Abstracts of Japan, Book 12, No. 304, p. E646, Aug. 18, 1988 "JP-A-63 070 672"(Mitsubishi Electric Corporation) Mar. 30, 1988.
321 British Journal of Photography 131 (1984) May, No. 19, London, Great Britain "Electronic Camera".
Funkschau Photokina, 1986, Book 2, #22, pp. 40–42, "Stille und bewegte Videobilder".
"VMC 2260 Video Memory Controller", ITT Semiconductors publication, pp. 1–24, #6251-248-7E.

Primary Examiner—James J. Groody
Assistant Examiner—Tuan Ho
Attorney, Agent, or Firm—Thomas L. Peterson

[57] ABSTRACT

A portable electronic picture recording device includes a camera, an A/D converter for converting the analog picture signal to digital picture data, a signal processing and control circuit for compressing the digital picture data for storage and for restoring the data on playback and for processing the picture signal frames in single-picture, multi-picture, and scene shooting (sequence) modes, an electronic memory having erasable, programmable, nonvolatile memory cells, and a D/A converter for converting restored digital picture data into analog output signals. The electronic memory has EEPROM cells formed at a high packing density with VLSI technology, so that the picture recording device can have camcorder-like functions without a moving storage medium and with comparatively low power consumption.

7 Claims, 2 Drawing Sheets

PORTABLE ELECTRONIC PICTURE RECORDING DEVICE WITH NONVOLATILE ELECTRONIC MEMORY

FIELD OF THE INVENTION

The present invention relates to a portable electronic picture recording device which uses electronic storage means for storing the pictures.

BACKGROUND OF THE INVENTION

Picture recording devices in which the storage device is a video cassette holding a magnetic tap wound on a spool are classified under the term "camera recorder" or the abbreviated name "camcorder". For recording and playback, besides the purely electronic signal-processing circuitry, a costly, bulky, and failure-prone tape transport mechanism is necessary for moving the tape at as constant a speed as possible. The power consumption of this mechanism requires a relatively large energy store in the form of one or more batteries if the device is to be independent of a power line over a prolonged period of time. If all necessary functional parts, such as the camera, power supply with batteries and charger, signal-processing circuits, video cassette and tape transport mechanism, etc., are contained in a single housing, the device becomes relatively heavy and unwieldy.

Much handier are "still video cameras", which are equipped with an electronic picture recording device in which a CCD (charge coupled device) chip converts the picture element-by-element into electronic signals which are then stored in a frame of a small magnetic disk instead of the magnetic tape of the camcorder. This device makes it possible to store in the range of 25 individual frames, but also to record a rapid sequence of frames or scenes. However, it suffers from the drawback that the disk does require a drive mechanism. Examples of conventional camcorders and still video cameras are described, for example, in the publication "Funkschau", No. 22, 1986, pages 40 to 42.

Electronic picture recording devices are finding increasing use because the picture and associated sound can be immediately reproduced via a conventional television receiver, and because the electronic storage medium can be erased and reused any number of times, which is impossible with the light-sensitive film commonly used in conventional picture recording devices.

Electronic still cameras under development are described in the article "Electronic Camera", in the British Journal of Photography, No. 19, May 1984, pages 486–487, as published in London. It is proposed that such a camera include an objective lens coupled to a CCD transducer having separate arrays for respective primary colors. An A/D converter converts the CCD signals into digital pulses which are processed then stored in an erasable IC memory having storage sites for a number of individual picture frames. The picture frames can be extracted via a D/A converter for display on a TV screen or passed to a printer for hard copy pictures. However, such an electronic still camera is only adapted to shooting individual still pictures.

Another electronic video apparatus is adapted for decision of the arrival order of contestants in races, such as horse races, bicycle races, auto races, or the like, as disclosed in European Patent Application No. 86/304,610, of Yamaguchi Cinema Corporation, published as Publication No. 0,207,675 on Jan. 7, 1987. This video apparatus is set in a fixed position and a line sensor scans successive image lines as the arriving objects move in front of the line sensor. The line image data is converted via an A/D converter and stored in successive frames in a random access memory (RAM). The image data can be retrieved from memory and converted to television signals for replay in still or scroll modes. However, such a device has limited utility and requires a constant power supply to maintain the image data in RAM.

SUMMARY OF THE INVENTION

It is, therefore, a primary object of the invention to provide a portable electronic picture recording device which requires no moving parts to store pictures and whose energy consumption is reduced to a minimum. It is a further object that such a device have the capability of reproducing a scene in a moving sequence as in camcorders, as well as single pictures as in still video cameras.

In accordance with the invention, a portable electronic picture recording device comprises a camera which generates an analog picture signal for individual or successive frames of images, an analog-to-digital converter for converting the analog picture signal to digital picture data, a signal processing an control circuit having means for compressing the digital picture data for storage in an electronic memory and for retrieving and expanding the data into television signals for display on a television receiver, respectively, wherein said signal processing and control circuit further includes means for processing data for picture signal frames in a plurality of modes, including single-picture, multi-picture, and scene shooting (sequence) modes, an electronic memory having a very large plurality of erasable, programmable, nonvolatile memory cells for storing digital picture data for a plurality of picture signal frames without the need for constant power supply, a digital-to-analog converter for converting restored digital picture data into analog output signals, and a power supply for supplying power to said signal processing and control circuit without the need for constantly supplying power to said electronic memory to maintain the data stored therein.

A fundamental ideal of the invention is to replace the moving storage medium of camcorders by fixed, programmable solid-state memories with nonvolatile memory cells, whose density on chips continues to increase as a result of technological development. In the preferred embodiment, the electronic memory is composed of electrically erasable programmable read-only memory (EEPROM) cells which can be formed at high densities on a chip using very largescale integration (VLSI) technology and do not require constant power supply to maintain stored data. The picture signal to be stored is digitized and fed to the signal processing and control circuit which writes the data into the memory and reads them out again for playback. For picture reproduction via a television receiver, a standard composite color signal must be generated. To this end, the blanking and synchronizing signals associated with the picture data read from the memory are added to the picture data either as digital signals before or as analog signals after the digital-to-analog conversion at the output end.

The above objects and the further features and advantages of the invention are described in detail below in conjunction with the drawings, of which:

DETAILED DESCRIPTION OF THE FIGURES

Figure 1:
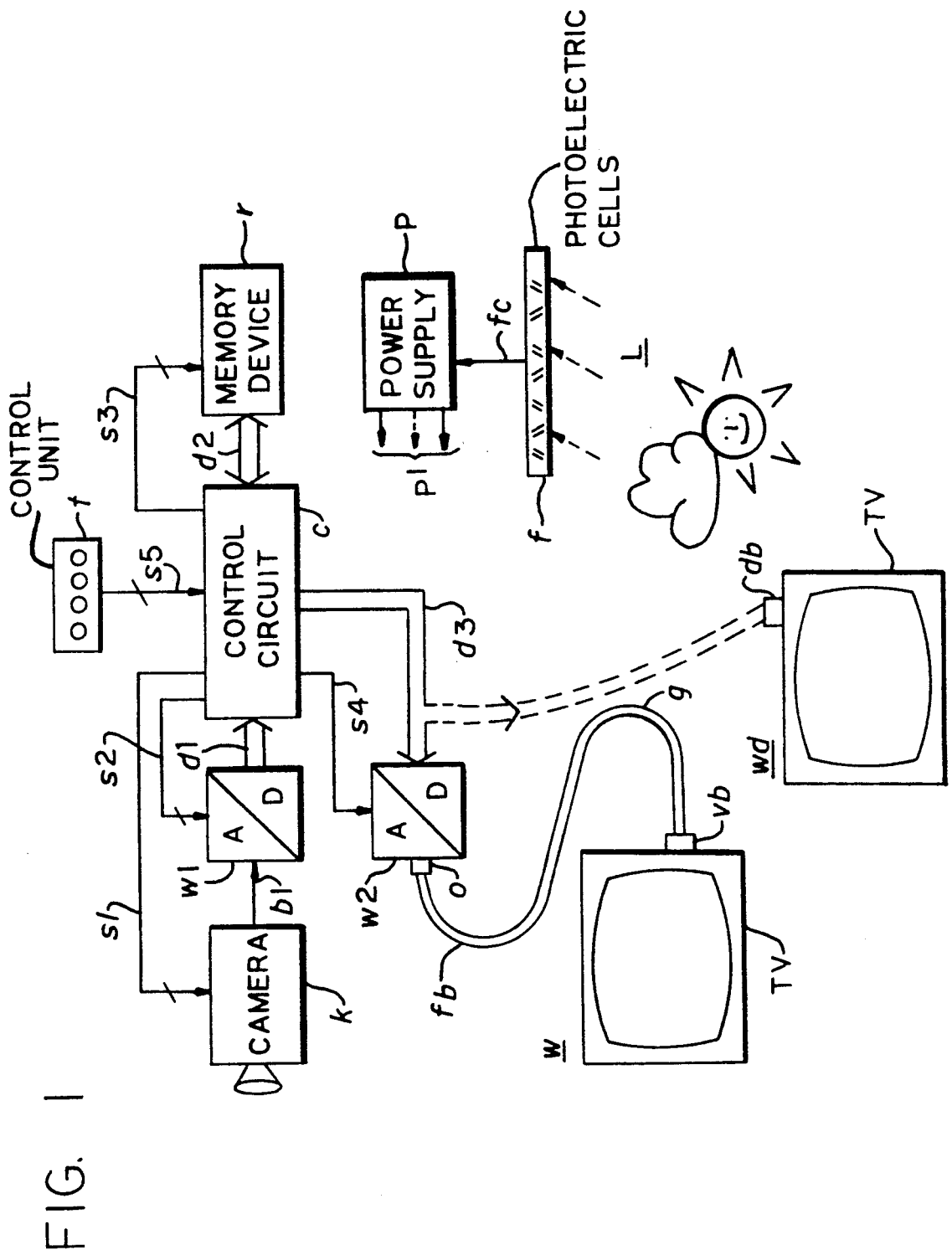
FIG. 1 is a schematic diagram of a portable electronic video device in accordance with the invention connected to a television receiver for an output display.

Referring to FIG. 1, an image input is provided by a camera k which generates an analog picture signal b1 in the usual manner, i.e., by line scanning. The analog picture signal b1 is digitized by means of the analog-to-digital (A/D) converter w1 and fed as the digital picture signal b2 to the signal processing and control circuit c. The latter performs a central control function of controlling, via a built-in clock generator unit and suitable control signals, all essential functions of the picture recording and reproducing device and even any simultaneous sound recording that may be made. First and second control signals s1, s2 are generated to control, for example, the camera k and the digitization process in the A/D converter w1, respectively.

Figure 2:
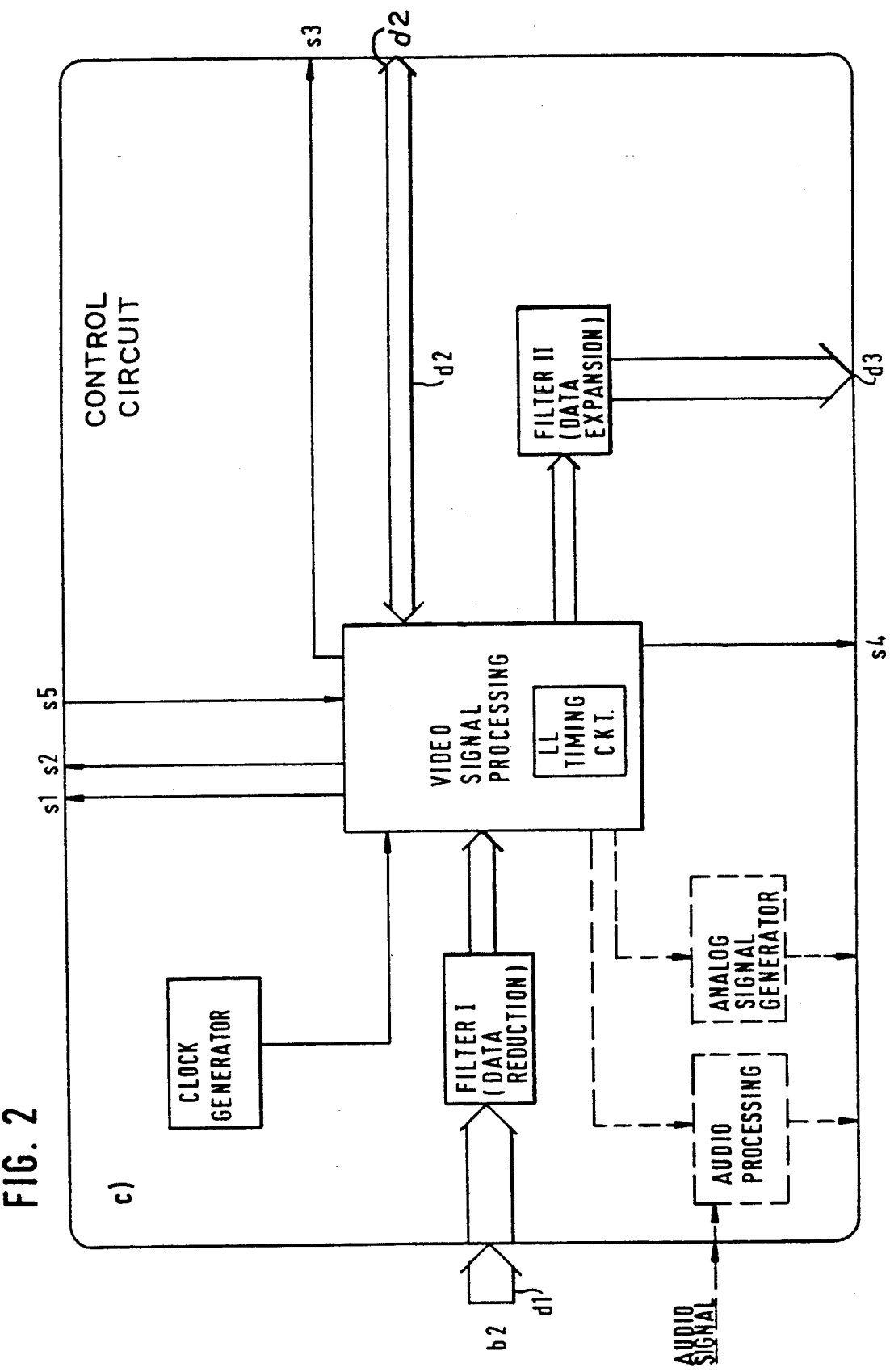
FIG. 2 is a schematic diagram of the signal processing and control circuit for the portable electronic video device shown in FIG. 1.

As illustrated in FIG. 2, the signal-processing and control circuit c includes circuits for processing the digital picture signal b2 applied over the first data line d1, e.g., a first filter circuit for reducing the data to be stored such as by setting defined threshold signal levels, or by various data compression techniques as is well known. Correspondingly, a second filter circuit is provided for expansion of the stored data to restore the data by the inverse step from its compression technique. Complementary data compression and expansion permit optimum utilization of the capacity of the memory device r. The latter is connected to the signal-processing and control circuit c via the bidirectional second data line d2 and is controlled by third control signals s3 from this circuit c. The data compression and expansion techniques may further incorporate a data reduction circuit with a differential pulse code modulator for video signals. See U.S. Pat. No. 4,748,503 entitled DATA REDUCTION CIRCUIT WITH A DIFFERENTIAL PULSE CODE MODULATOR FOR VIDEO SIGNALS by Peter Pirsch issued on May 31, 1988. That patent describes a data reduction circuits that employs a differential pulse code modulator for input video signals where the timecritical loop includes a loop subtractor (s2), a quantizer (q)- and a -loop delay element (v3), so that differential pulse code modulation can be performed at higher clock rates than with conventional architectures. With 2 μm CMOS or N-channel MOS technology, for example, clock rates of 17 to 20 MHz are possible. The circuit includes a limiter circuit which applies the input video signals to the loop subtractor minuend input after processing the same. The output of the delay element in the loop is applied to inputs of a first adder, a vertical predictor and a constant multiplier, the multiplier receives a weighting factor equal to the square of a given weighting factor with the output of the multiplier applied to the subtrahend input of a first subtractor whose output is coupled to the input of the loop subtractor via a delay element. The output of the vertical predictor is applied respectively to the inputs of another constant multiplier, another delay element and the subtrahend input of another subtractor. The outputs of these units are applied to enable input video signals as processed to be applied to the minuend input of the first subtractor to thereby reduce the circuitry needed in the time critical loop. The techniques and structures employed in U.S. Pat. No. 4,748,503 can be used herein.

Depending on the internal organization of the memory device r, data is written in serially or as blocks with block addresses or as individual data units with associated addresses. Block transfer is particularly advantageous, since each block then corresponds to at least one complete picture line. The memory device r has a large plurality of programmable solid-state nonvolatile memory cells, for which a high packing density on chips can be obtained as a result of current technological development. Preferably, the memory device r is composed of electrically erasable programmable read-only memory (EEPROM) cells formed using VLSI technology which do not require a constant power supply in order to maintain stored data.

The data read from the memory device r is transferred via the signal-processing and control circuit c to the digital-to-analog (D/A) converter w2. This is done over the third data line d3 after the data from the memory device r has been suitably conditioned in the processing unit of the signal-processing and control circuit c. For example, blanking and synchronizing signals are digitally added to the stored picture data, so that a standard (PAL, NTSC, or SECAM color-television standard) composite color signal fb is available at the output of the D/A converter w2. The output of the latter is applied over a cable g connected to the output jack o to the input of a reproducing or display device w, e.g., a commercially available television receiver TV, which is fed with the output from the picture recording device according to the invention via the antenna or video input jack vb.

If a display device wd has an input jack db for digital picture signals, the D/A converter w2 is unnecessary, and the third data line d3 can be connected directly to this input jack db. In FIG. I this is indicated by dashed lines from the° third data line d3 connected to the display device wd, which is a television. The D/A converter w2 is controlled by fourth control signals s4, which are also generated by the processing unit of the signal-processing and control circuit c.

In certain circumstances, it may be simpler to add the blanking and synchronizing signals to the stored picture signals as analog signals, i.e. only after the digital-to-analog conversion. This is not shown in the drawings, since the additive mixing of the different analog signals with the standard composite color signal fb would then be performed by analog circuits like in conventional camcorders. In this (analog) case, the blanking and synchronizing signals are generated in the signal-processing and control circuit c by a suitable analog signal generator (dashed lines in FIG. 2) triggered by a line-locked timing circuit. In the digital case, they are derived from corresponding data sequences which are stored in a (ROM) memory and are also called up by the line-locked timing circuit.

The signal-processing and control circuit c is fed with fifth control signals s5 from the control unit t, which has buttons for operator selection of single-picture, multipicture or scene shooting (picture sequence), playback and other modes. These fifth control signals s5 initiate the corresponding functions which are coordinated together in the picture recording device. Thus, the advantages of camcorderlike functions can be obtained in a more portable and handy apparatus which has an electronic memory that obviates the need for moving storage medium mechanisms and has very low power requirements.

FIG. 1 also shows the power supply p which feeds the picture recording device via supply lines pl. Besides the usual devices (not shown), such as main external line connection, transformer, rectifier, regulated DC voltage stage, batteries, etc., the power supply p can contain a generating device which uses photoelectrically-generated charging current fc from photoelectric transducer cells f to charge or trickle-charge the batteries. The photoelectric transducer cells f can be mounted at an advantageous point of the housing of the picture recording device, so that they are exposed to the ambient light L as fully as possible.

One implementation of a signal processing circuit similar to the signal-processing and control circuit c is described, as an example, in the data sheet of ITT Semiconductors entitled "VMC 2260 Video Memory Controller", Edition 1988/8, order No. 6251-248-7E. Shown therein is a, monolithic integrated circuit signal processor for storing one complete television picture in associated dynamic random access memories to implement a flicker free TV display. It includes signal processing circuits which serve, inter alia, to reduce the data of the digitized picture signals in order to minimize the memory capacity required for storage and playback. Other types of integrated filter circuits can also be used to serve the data reduction and complementary expansion functions. The necessary control signals are governed by means of an externally applied clock signal. It is also possible to record individual "snapshots" of up to nine different television-signal sources.

In the picture recording device according to the invention, storage of the picture data in the memory device r would be disadvantageous despite the high packing density attainable, because the memory function would have to be continuously "refreshed" which involves a continuous supply of electrical power. Thus, the invention provides for the combination of data reduction and expansion circuits and erasable, programmable nonvolatile memory cells. The nonvolatile memory cells are more advantageous for the implementation of the memory device r, because once they are written the power supply does not have to be maintained constantly on to maintain storage of the data, however the cells must be made easily erasable so that they can be rewritten. Such memory cells are commercially available, for example, in the form of electrically erasable and electrically programmable read-only memory (EEPROM) cells which can be implemented to a high packing density using very large scale integration (VSLI) technology. For example, each video frame of average quality may require a storage capacity from between 3 Mbits to 15 Mbits. It is understood that memory capacity continues to expand and larger capacity memories continue to become available.

The nonvolatile memory cells in the memory device r may also be nonvolatile ferroelectric memory cells as are disclosed, for example, in U.S. Pat. No. 4,713,157 issued to McMillan et al. With such memory cells, VLSI mass memories can be formed with a packing density comparable to that of conventional dynamic memories.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

We claim:

1. A portable electronic picture recording device comprising:
    a camera which generates an analog picture signal for at least one frame of images;
    an analog-to-digital (A/D) converter for converting the analog picture signal too digital picture data;
    a signal processing and control circuit having means for compressing the digital picture data for storage in an electronic memory and for retrieving and expanding the digital picture data into television signals for display on a television receiver, respectively, wherein said signal processing and control circuit further includes means for processing data for picture signal frames in a plurality of modes, including single-picture, and scene shooting (sequence) modes and wherein said signal processing and control circuit further includes a first filter for reducing said digital picture data for storage and a second filter for data expansion upon playback;
    said electronic memory having a very large plurality of erasable, programmable, nonvolatile memory cells for storing digital picture data for a plurality of picture signal frames without the need for constant power supply;
    a digital-to-analog (D/aA) converter for converting restored digital picture data into analog output signals; and
    a power supply for supplying power to said signal processing and control circuit without the need for constantly supplying power to said electronic memory to maintain the data stored therein.

2. A portable electronic picture recording device according to claim 1, wherein said nonvolatile memory cells are electrically erasable and electrically programmable read only memory (EEPROM) cells.

3. A portable electronic picture recording device according to claim 1, wherein said nonvolatile memory cells are ferroelectric memory cells.

4. A portable electronic picture recording device according to claim 1, wherein said power supply includes batteries which are recharged by photoelectric transducer cells.

5. A portable electronic picture recording device according to claim 1, wherein the output of said D/A converter is a standard composite color signal.

6. A portable electronic picture recording device according to claim 1, wherein the input of said D/A converter is tapped as a digital signal ahead of said D/A converter and fed to a digital input connection of a reproducing device.

7. A portable electronic picture recording device according to claim 1, further comprising means for storing and reproducing associated sound signals..

* * * * *